(12) United States Patent
Elend et al.

(10) Patent No.: US 11,431,439 B1
(45) Date of Patent: Aug. 30, 2022

(54) CONTROLLER AREA NETWORK TRANSCEIVER

(71) Applicant: NXP B.V., Eindhoven (NL)

(72) Inventors: Bernd Uwe Gerhard Elend, Hamburg (DE); Rolf van de Burgt, Oosterbeek (NL); Franciscus Johannes Klösters, Schaijk (NL); Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/301,713

(22) Filed: Apr. 12, 2021

(51) Int. Cl.
*H04L 1/00* (2006.01)

(52) U.S. Cl.
CPC ............ *H04L 1/004* (2013.01); *H04L 1/0006* (2013.01); *H04L 2001/0094* (2013.01)

(58) Field of Classification Search
None
See application file for complete search history.

(56) References Cited

U.S. PATENT DOCUMENTS

| | | |
|---|---|---|
| 9,954,892 B2 | 4/2018 | Elend |
| 10,361,934 B2 | 7/2019 | Elend |
| 2014/0328357 A1* | 11/2014 | Fredriksson ........ H04L 12/4135 370/520 |
| 2015/0095532 A1* | 4/2015 | Muth ........................ G06F 3/00 710/105 |
| 2016/0094312 A1* | 3/2016 | Fredriksson .......... H04L 1/0041 714/807 |
| 2021/0044600 A1 | 2/2021 | Elend |
| 2021/0044615 A1 | 2/2021 | Elend |

OTHER PUBLICATIONS

U.S. Appl. No. 16/905,901, filed Jun. 18, 2020, entitled: "Can Transceiver." The Examiner is referred to the copending patent prosecution of the common Applicant (no attachment).
U.S. Appl. No. 17/009,767, filed Sep. 1, 2020, entitled: Can Transceiver. The Examiner is referred to the copending patent prosecution of the common Applicant (no attachment).

* cited by examiner

*Primary Examiner* — Mujtaba M Chaudry

(57) ABSTRACT

A transceiver for sending and receiving data from a controller area network (CAN) bus is disclosed. The transceiver includes a microcontroller port, a transmitter and a receiver. The transceiver is configured to detect a CRC delimiter or an error signal in a CAN frame and after the detection, allow a microcontroller coupled with the microcontroller port to only send a predetermined data pattern until a bus idle is detected.

17 Claims, 4 Drawing Sheets

CONTROLLER AREA NETWORK TRANSCEIVER

BACKGROUND

A Controller Area Network (CAN bus) is a vehicle bus standard designed to allow microcontrollers and devices to communicate with each other's applications without a host computer. CAN is a message-based protocol that uses two wires to enable multiple devices to communicate with each other and is used in many type of applications including automotive applications. For each message, the data in a packet is transmitted sequentially but in such a way that if more than one device transmits messages at the same time, only the highest priority message is able to continue while other devices stop transmitting their message. This process, known as "arbitration", is used by all sending devices and the device that attempts to send the highest priority message wins the arbitration. Transmitted packets are received by all devices, including by the transmitting device receiving its own message. However, a malicious device may attempt to hijack the bus control even after losing the arbitration or by manipulating bus idle time detection.

CAN is a two-wire differential, half-duplex, high-speed serial network typically used to provide communications between network nodes without loading down microcontrollers. CAN transceivers interface between the CAN protocol controller and the physical wires of the CAN bus lines. A transceiver is used by a microcontroller to send and receive data on a CAN bus. A typical transceiver normally provides a ISO 11898 standard compliant communication over the CAN bus without scrutinizing the data content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a transceiver for sending and receiving data from a controller area network (CAN) bus is disclosed. The transceiver includes a microcontroller port, a transmitter and a receiver. The transceiver is configured to detect a CRC delimiter or an error delimiter or an error signal in a CAN frame on the CAN bus and after the detection, allow a microcontroller coupled with the microcontroller port to only send a predetermined data pattern until a bus idle is detected.

In some examples, the transceiver is configured to invalidate a data frame sent by the microcontroller by sending an error signal on the CAN bus if the data frame does not conform with the predetermined data pattern. The transceiver may also be configured to disable the transmitter for a predetermined period after invalidating the data frame. The predetermined data pattern may include a dominant bit followed by a recessive bit or at least six dominant bits. The transceiver may be configured to suppress a data frame sent by the microcontroller if a width of a bit in the data frame is smaller or wider than a predefined threshold. In some examples, the predefined threshold may be determined based on the baud rate or protocol settings for the CAN protocol version for which the transceiver is being used. The transceiver may be configured to allow any CAN conform data pattern after the detection of the bus idle and until a next CRC delimiter or a next error delimiter is detected.

In another embodiment, a method for preventing a node from interrupting a communication on a controller area network (CAN) bus is disclosed. The method includes monitoring a CAN data frame on the CAN bus and detecting a CRC delimiter in the CAN data frame and upon the detection allowing the node to only send a predetermined data pattern until a bus idle is detected.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
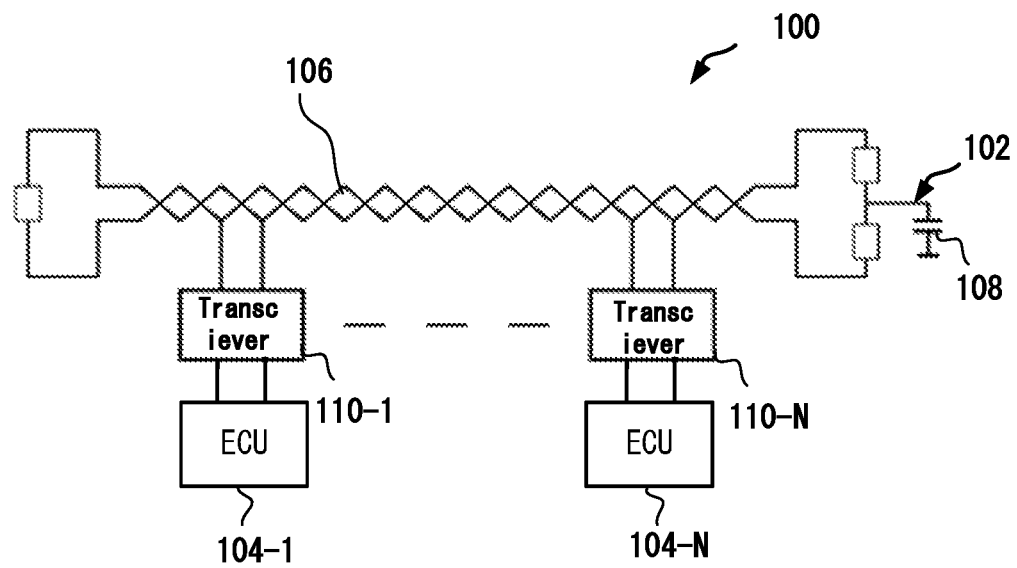
FIG. 1 depicts a controller area network (CAN) bus with communication nodes.

Note that figures are not drawn to scale. Not all components of the secure transceiver are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Communication using CAN is defined by the International Standard Organization (ISO) as ISO-11898 and can be considered in the context of the seven-layer OSI model for communications. The ISO-11898-1 standard for CAN relates to the data link layer and the effects of this on the surrounding layers. ISO-11898-2 relates to part of the data link layer and the physical layer. Implementations of CAN depend on the following components: 1) Physical layer transceiver to translate the CAN messages to/from differential signals across a physical medium such as a twisted pair cable. 2) CAN controller that implements the data link layer. These two components adhere to the CAN specification to ensure communication conforms to the ISO 11898 standard. 3) CAN application, implementing the application layer protocol (translating the application data to/from CAN messages). A malicious CAN application may attempt to disrupt the traffic on the CAN bus by creating glitches in the CAN bus data transmission to prevent a proper bus idle detection by all nodes on the CAN bus.

Controller Area Network (CAN) is a peer-to-peer network. Meaning that there is no master that controls when individual nodes have access to read and write data on the CAN bus. When a CAN node is ready to transmit data, it checks to see if the CAN bus is free and then simply writes a CAN frame onto the network. The CAN frames that are transmitted do not contain addresses of either the transmitting node or any of the intended receiving node(s). Instead, an arbitration ID that is unique throughout the network is contained in a data frame. All nodes on the CAN network receive every CAN frame that is transmitted by any node, and, depending on the message or arbitration identifier of the transmitted frame, each CAN node on the network decides whether to accept the frame for further processing.

If multiple nodes try to transmit messages onto the CAN bus at the same time, the node with the highest priority (lowest value of message or arbitration identifier) gets bus access. Lower-priority nodes (or messages) must wait until the bus becomes available before trying to transmit again. CAN nodes (e.g., ECUs) use transceivers to interface with the CAN bus. The transceivers include an Rx port and a Tx port to enable communication with other CAN nodes through the CAN bus 100. Transceivers normally provide a simple interface for mode control from a device/microcontroller in a network. A typical standard transceiver makes use of up to two dedicated mode control pins, and this means that there are usually not more than four different states of operation.

The CAN protocol specifies the structure of a CAN frame. The CAN frame includes:
1. SOF (start-of-frame) bit—indicates the beginning of a message with a dominant (logic 0) bit.
2. Message or Arbitration ID—identifies the message and indicates the message's priority. Frames come in two formats—standard, which uses an 11-bit arbitration ID, and extended, which uses a 29-bit arbitration ID.
3. IDE (identifier extension) bit—allows differentiation between standard and extended frames.
4. RTR (remote transmission request) bit—serves to differentiate a remote frame from a data frame. A dominant (logic 0) RTR bit indicates a data frame. A recessive (logic 1) RTR bit indicates a remote frame.
5. DLC (data length code)—indicates the number of bytes the data field contains.
6. Data Field—contains 0 to 8 bytes of data (for CAN FD protocol, up to 64 bytes).
7. CRC (cyclic redundancy check)—contains a cyclic redundancy check code and a recessive delimiter bit. The CRC field is used for error detection.
8. EOF (end of frame) marks the end of the frame.
9. ACK (ACKnowledgement) slot—any CAN controller that correctly receives the message sends an ACK bit at the end of the message. The transmitting node checks for the presence of the ACK bit on the bus and reattempts transmission if no acknowledge is detected.
10. CAN Signal—an individual piece of data contained within the CAN frame data field. You also can refer to CAN signals as channels. Because the data field can contain up to 8 bytes of data in Classical CAN and up to 64 bytes in CAN FD.

Flexible data rate frame format (CAN FD frame format) includes additional bits but also includes CRC, EOF and other frame bits that are relevant with respect to the embodiments described herein. The embodiments of the CAN transceiver described herein are applicable to all CAN versions so long as the frame format of the CAN version includes CRC, EOF and error signal bits.

In traditional differential data transmission Logic 1 is transmitted as a voltage level high on one noninverting transmission line and low on the inverting line. Correspondingly, Logic 0 is transmitted as low on the noninverting line and high on the inverting line. The receiver uses the difference in voltage between the two lines to determine the Logic 1 or Logic 0 that was transmitted. A driver on the bus can also be in a third state, with the driver outputs in a high impedance state. If all nodes are in this condition, the bus is in an idle state. In this condition, both bus lines are usually at a similar voltage with a small differential. Signaling for CAN differs in that there are only two bus voltage states; recessive (driver outputs are high impedance) and dominant (one bus line, CANH, is high and the other, CANL, is low) with predefined voltage thresholds. Transmitting nodes transmit the dominant state for Logic 0 and the recessive state for Logic 1. An idle CAN bus is distinguished from recessive bit transmission simply by detection of multiple recessive bits.

FIG. 1 depicts a controller area network (CAN) bus 100. The CAN bus 100 includes terminating end resistors to suppress wave reflections. In some embodiments, a capacitor 108 may also be used at a terminating end. The CAN bus 100 includes a twisted wire pair 106. The twisted wire pair 106 includes CANH and CANL wires. The CAN bus 100 may include a plurality of communication microcontrollers or electronic control units (ECUs) 104-1 . . . 104-N coupled with the twisted wire pair through a plurality of secure transceivers 110-1 . . . 110-N (e.g., the transceiver 120 described in FIG. 4). The capacitor 108 is typically 4.7 nF. In one example, the resistors coupled with the capacitor 108 are typically 60 ohm each (total 120 ohm at each end).

As shown, the microcontrollers (or ECUs) 104-1 . . . 104-N are connected via an unshielded twisted pair 106. Termination is implemented at the far left- and right-hand side of the CAN bus 100. There are two options, either by using a single resistor as shown in the left-hand side of the CAN bus 100, or via two resistors and the capacitor 108, referred to as "split-termination" as shown on the right-hand side of the CAN bus 100. The latter method is commonly used as it offers an additional low-pass filtering to improve EMC performance.

Figure 2:
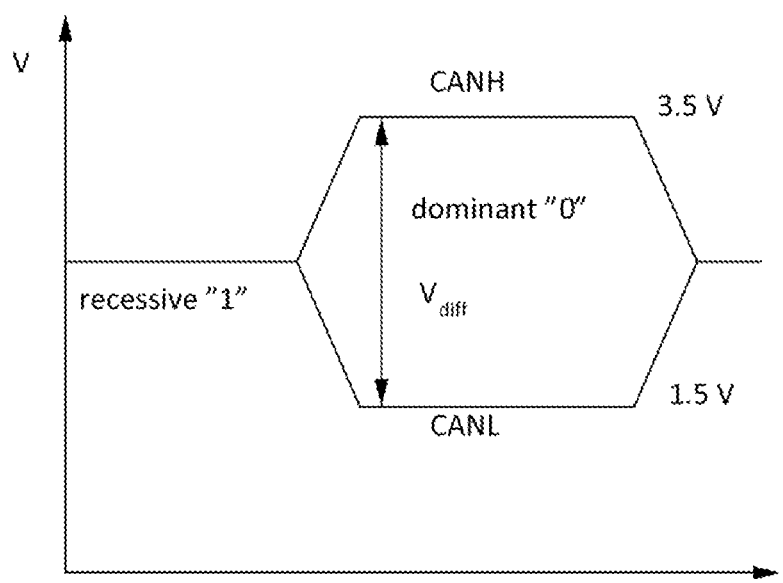
FIG. 2 depicts CAN bus communication protocol showing a representation of "0" and "1" based on a differential voltage at CANH and CANL.

As shown in FIG. 2, in normal operations (when no errors are present), the CAN bus 100 signals CANH and CANL are driven such that a differential voltage is generated (to send a dominant signal) or no differential signal is generated (to send a recessive bit). In some implementations, for a dominant bit ("0") the voltage at CANL is approximately 1.5V and the voltage at CANH is 3.5V and $V_{diff}$ represents a difference between the voltages at CANH and CANL. In some examples, $V_{diff} > 0.9V$ may be considered a dominant bit and $V_{diff} < 0.5$ may be considered a recessive bit.

The communication nodes (e.g., microcontrollers or ECUs 104-1 . . . 104-N) on the CAN bus 100 that wish to send data on the CAN bus send a dominant SOF bit when the CAN bus 100 is idle (e.g., in the recessive state for a duration) to indicate that the nodes would like to send a data frame. Next, each node sends a message identifier. Note that the nodes are configured such that no two nodes can send a data frame including the same message identifier. The CAN protocol provides an 11-bit message identifier. In another version of the CAN protocol, the message identifier is specified to include 29 bits. The relative priority of a message identifier is characterized by the value of the message identifier. A lower value message identifier has a higher priority. For example, the message identifier with the value 11001000111 (0x647) will have a higher priority than the message identifier with the value 11011111111 (0x6FF).

If the ECU 104-1 and the ECU 104-N simultaneously send SOF bit and then start transmitting the message identifiers 11001000111 and 11011111111 respectively, on the fourth bit, the ECU 104-1 will win the arbitration because it will send a dominant bit, which will overwrite the recessive bit sent by the ECU 104-N. The ECU 104-1 will read a dominant bit after sending a dominant bit on the CAN bus 100 and will continue to send further data bits whereas the ECU 104-N will read a dominant bit after having sent a recessive bit (e.g., the fourth most significant bit in the above message identifier example) and will assume that it has lost the arbitration and will stop sending further data bits on the CAN bus 100, and will wait for the CAN bus 100 to be free again before attempting to send the message, at which time, the process of arbitration will start again.

Figure 3:
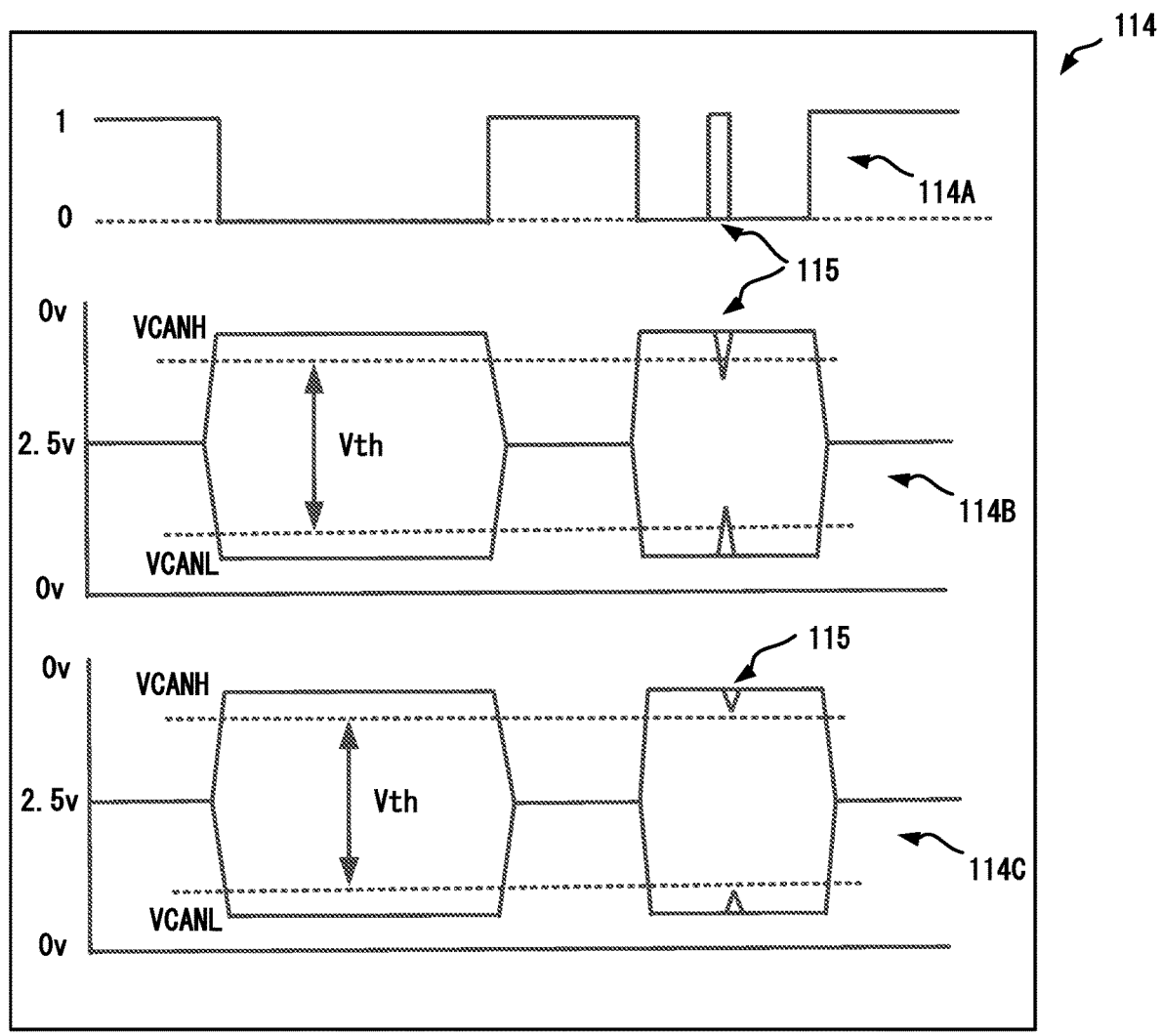
FIG. 3 depicts sample logical and physical CAN signals showing a glitch in accordance with one more embodiments of the present disclosure.

FIG. 3 shows sample logical and voltage CAN signals 114. The signal 114A shows a logical signal that corresponds to the voltage signal 114B. A spurious ECU (e.g., 104-N) may insert a glitch 115 in the signal to disrupt the transmission. As shown, the glitch 115 may cause data error because during a recessive bit transmission, a dominant section will be introduced causing a data error. The signal 114B shows VCANH and VCANL voltage levels. The voltage levels are shown for example only. In some examples, the these voltage levels may be different as allowed by the CAN protocol. $V_{th}$ is a threshold voltage (e.g., $V_{diff}$ in FIG. 2). The differential voltage levels below $V_{th}$ may translate into a recessive bit and the differential voltage levels above $V_{th}$ may translate into a dominant bit. In some examples, as shown in the signal 114C, the voltage level of the glitch 115 may attenuate due to low/high pass filters created by the parasitic components of the wire pair 106 when the signal transmits over the wire to a distant node. It should be noted that in some examples, the glitch 115 may also be caused by noise.

In some examples, to invalidate the effect of a glitch introduced by an spurious microcontroller, the bit timing recovery process with configurable thresholds may be used and a transceiver 120 (described in FIG. 4) ensures that the microcontroller coupled to the transceiver 120 is prevented from inserting a glitch between the thresholds. If the communication node including the microcontroller 104-N is transmitting a frame, the receiving node including the microcontroller 104-1 consisting of the transceiver 120, performs independently clock recovery and sampling. If the microcontroller 104-N includes a defect or compromised software, it can occur that the bit patterns transmitted by the transmitting node can contain intended or unintended glitches or deviating bit timing. Due to difference in signal attenuation or signal propagation times in the network, it can occur that the receiving nodes decode the received data differently. However, in other examples, as described in details herein, the transceiver 120 is configured to prevent the microcontroller coupled with the transceiver 120 from sending any bit or a glitch patterns that do not conform with a predefined bit pattern or patterns between the CRC delimiter bit and until the bus idle is detected on the CAN bus 100. Accordingly, as soon as the CRC delimiter of a CAN message has been decoded (regardless whether the message was received or send by a local microcontroller coupled with the transceiver 110-1 or by another node including the transceiver 110-N), or in case a decoding error occurred, the embodiments of a secure transceiver described herein only allow the local node (e.g., the microcontroller 104-1 coupled with the secure transceiver) to send either exactly one or at least six dominant bits until bus idle has been detected. Such data transmission restrictions ensure that all CAN nodes on the CAN bus 100 have a consistent notion of whether the bus is idle or not.

Figure 4:
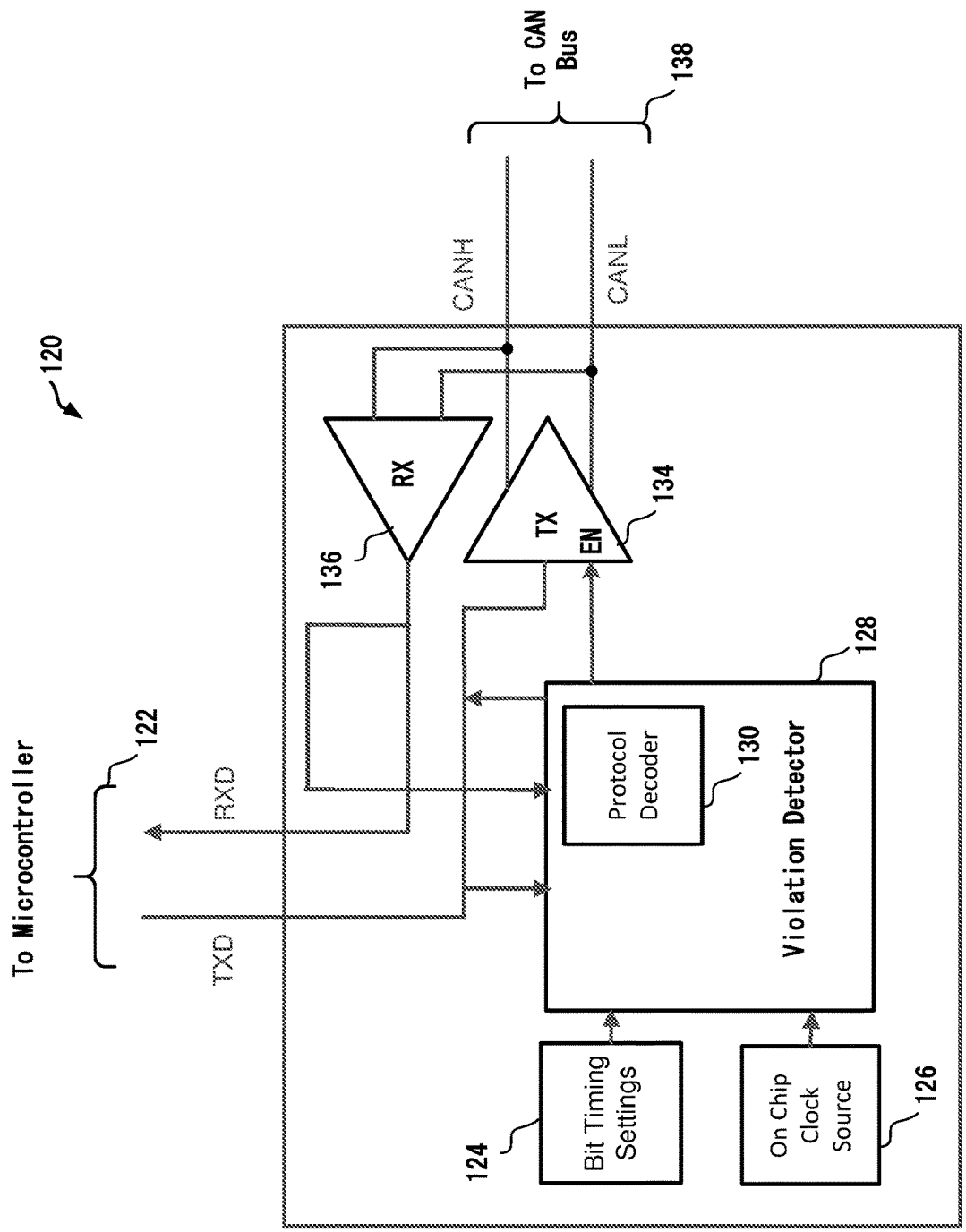
FIG. 4 shows a schematic of a secure transceiver in accordance with one or more embodiments of the present disclosure.

FIG. 4 shows a transceiver 120. Note that many known components of the transceiver 120 have been omitted so as not to obfuscate the present disclosure. The transceiver 120 may replace the transceiver 110-N in FIG. 1 (and of course any other transceiver on the CAN bus 100) to make the CAN bus 100 shown in FIG. 1 a secure CAN bus. With the transceiver 120 monitoring the ECU 104-N, the ECU 104-N will no longer be able to maliciously interrupt the data communication on the CAN bus 100.

The transceiver 120 includes a transmitter (TX) 134 and a receiver (RX) 136. The transceiver 120 includes a microcontroller port 122 to send/receive data from a microcontroller or ECU. The transceiver 120 also includes a CAN bus port 138 to send/receive data to/from a CAN bus 100. The data received from the CAN bus 100 is transmitted to the microcontroller to enable the microprocessor to functionally process the received data. Similarly, when a data is received from the microcontroller or ECU, the received data is transmitted to the CAN bus 100. The TX 134 translates the data received from the microcontroller in a signal that is compliant with CAN standards.

In some examples, the transceiver 120 is equipped with a CAN ISO11898 compliant receiver (e.g., the RX 136) that is capable of decoding frames on the CAN bus 100. In such examples, the RX 136 may include a protocol decoder 130. In other examples, the protocol decoder 130 may be external to the RX 136. The transceiver 120 may include a bit timing settings module 124 and an on chip clock source 126 to synchronize bit timings, sampling times and widths with the CAN bus 100. The bits received on the microcontroller port 122 may be checked for length, glitches and/or improper bit timing. If a deviation from expected behavior is detected, the violation detector 128 will invalidate the frame on the CAN bus 100 to cause the transmitting node to retransmit the frame and/or disable transmit and/or receiving capabilities of the transceiver 120 to isolated unexpected behavior of the microcontroller that is coupled with the microcontroller port 122.

A violation detector 128 may be included to monitor the CANH and CANL lines for any data glitches or transmission violations by the microcontroller coupled with the transceiver 120 via the port 122. The CAN protocol decoder 130 may fully or partially implement data link layer operations as is known in the field. For example, in receive operations, a CAN protocol decoder 130 stores received serial bits from the transceiver until an entire message is available for fetching by the microcontroller. The CAN protocol decoder 130 may also decode the CAN messages according to the standardized frame format of the CAN protocol.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller 114 can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The bit timing settings module 124 may also keep track of a current bit position in a data frame when the data frame is being processed by the violation detector 128. Typically, the bit width and sample time are known and preset according to the protocol being used. In some examples, the CAN frame may include information such that the baud rate from which a bit width can be determined. The violation detector 128 monitors the data being sent by the microcontroller coupled to the microcontroller port 122 and if the violation detector 128 detects a glitch or a signal not ISO11898 conforming being sent by the microcontroller coupled with the microcontroller port 122 between the CRC delimiter bit and the detection of bus idle on the CAN bus 100, the violation detector 128 may use the EN input of the TX 134 to prevent the microcontroller from transmitting any data for a predetermined period. In some embodiments, the violation detector 128 may send a CAN error frame or invalidation signal on the CAN bus 100 to indicate that the earlier frame was invalid and should be disregarded by the communication nodes.

The issue with glitches, noise or misbehaving microcontroller in terms of bit timing, is that there is a possibility that in a large network with several receiving nodes, some nodes might sample different data. As the glitch 115 (shown in FIG. 3) propagates through the network, the distant nodes will see a different data because the filtering effect will attenuate (such that the differential voltage at the glitch 115 is below the threshold $V_{th}$) the glitch 115 before it reaches a distant node. If a TX 134 has a short glitch on the digital input, it will result in spikes on both sides of the differential output as shown in FIG. 3. The TX 134 has a moderate low pass filter behavior. On a receiver that is close by, the differential glitching signal is decoded as the same signal that the transmitter had on the input. The signal on the far receiving node will not see the glitch 115 trespassing the threshold to go back to recessive and the receiver will sample a dominant bit. The fact that different nodes get different information contents on the CAN bus 100 is not desired in terms of safety and security.

The protocol decoder 130 may be configured to perform clock recovery on RXD and/or TXD and includes a state machine to follow the CAN protocol to be aware of the CAN protocol and match the required bit timings. In some examples, the bit timings may be different for different frames. In such examples, the data frame will include the bit rate switch bit to enable the transceiver 120 to determine a bit length of the data bit included in the frame. The transceiver 120 in this example may include an on-chip oscillator and memory (may be included in the bit timing settings module 124) to store the bit timing settings for the CAN network. In case of a violation of the CAN protocol or glitch detection configuration, the transceiver 120 may transmit dominant bits on the CAN bus 100 to invalidate the frame and/or overrule the RXD towards the microcontroller coupled with the microcontroller port 122 and/or isolate the TXD path towards the CAN bus 100.

The configuration data, containing bit timing settings, may be pre-stored in the transceiver 120. The configuration data may be stored in non-volatile memory or downloaded in volatile memory before the transceiver 120 is brought to an operational mode. The transceiver 120 is configured to modify the RXD data on the fly towards the microcontroller coupled with the microcontroller port 122 and overrule the data on the CAN bus 100 by transmitting a dominant bit or an invalidation signal and/or disable the TX 134 via the EN signal.

In some examples, the transceiver 120 may not include any additional pins compared with a conventional transceiver so that the transceiver 120 may be used as a "drop in" to replace a conventional CAN transceiver. In the examples in which the glitch detector 128 is implemented either fully or partially in software, the transceiver 120 may be configured to be programmed with additional data validation rules. In some examples, if the transceiver 120 is configurable to be programmed, a tamper proof security mechanism may be employed such that only authorized devices or entities may alter the existing programming stored in the transceiver 120. In some examples, the microcontroller coupled with the microcontroller port 122 may have won the arbitration, hence is allowed to start sending the data frames to the CAN bus 100 via the TX 134. The microcontroller may then attempt to introduce a glitch in a data frame. Any data frame sent to the CAN bus 100 is received by all nodes including the local node that sent the data frame. Hence, the same processes of invalidating the glitch will be applicable even if the local microcontroller has sent that data frame as the same data frame will be also be received by the RX 136 to enable the transceiver 120 to determine bit timings and start monitoring the transmission for any glitches or prohibited data.

The violation detector 128 is configured to monitor the CAN bus 100 coupled with the CAN bus port 138. When the violation detector 128 sees the CRC delimiter bit on the CAN bus 100, the transceiver 120 is configured to allow the microcontroller coupled with the microcontroller port 122 only to send either one or at least six bits until the bus idle has been detected. In some examples, if the microcontroller coupled with the microcontroller port 122 has won the arbitration and is entitled to send data frames, the violation detector 128 may monitor the TxD line of the microcontroller port 122 and to allow the microcontroller coupled with the microcontroller port 122 only to send either one or at least six bits until the bus idle has been detected.

A malicious microcontroller (or in some examples, a malfunctioning microcontroller) without any constrained access to the CAN bus signal is able to manipulate the bus IDLE detection. Therefore, the malicious microcontroller may prevent some CAN nodes from detecting IDLE, while other CAN nodes do detect IDLE on the CAN bus. In such cases where different CAN nodes have different notion of the status of the CAN bus, CAN messages may be sent by the malicious microcontroller to bypass security mechanisms. For example, assuming a node a sending a legitimate CAN message and adds short glitch in the end of frame (EOF) field, with a proper timing of such glitch the malicious microcontroller may delay the detection of the bus idle in CAN decoders in vicinity, while distant nodes do detect idle as expected due to the natural filtration of the glitch. If the security mechanism in one node has not detected idle, while a remote CAN node did detect idle, a window for bypassing pass-list protection (as described in U.S. Pat. No. 10,361,934 by Elend et al entitled "CONTROLLER AREA NETWORK (CAN) DEVICE AND METHOD FOR CONTROLLING CAN TRAFFIC", which is being incorporated herein by reference in its entirety) may become available. In some examples, the malicious microcontroller may prevent some nearby nodes from transmitting data by preventing these other nodes from detecting the bus idle by continuing to insert glitches. The manipulation of IDLE detection can be prevented by only allowing a CAN node after sending the CRC delimiter to send a dominant signal of either 1) exactly one arbitration bit time followed by a recessive signal of at least one arbitration bit time or 2) a dominant signal of six or more arbitration bit widths/times. This limitation does not prevent the CAN node from being CAN protocol compliant. In some other examples, the violation detector 128 may be configured to define the type of data or pattern of data the CAN node can send after the CRC delimiter and before the violation detector 128 or the RX 136 detect the bus IDLE. In some embodiments, the violation detector 128 is also configured to apply the data transmission restrictions, as described above, on the microcontroller coupled with the microcontroller port 122 after errors have been detected to protect the error delimiter or the error signal field in the same way as the end-of-frame (EOF) field. In some examples, if the allowed data pattern is transmitted by the microcontroller during the data transmission restrictions for more than a predefined number of times, the transceiver 120 is configured to disable the transmission of any data from the microcontroller for a preconfigured period of time.

Figure 5:
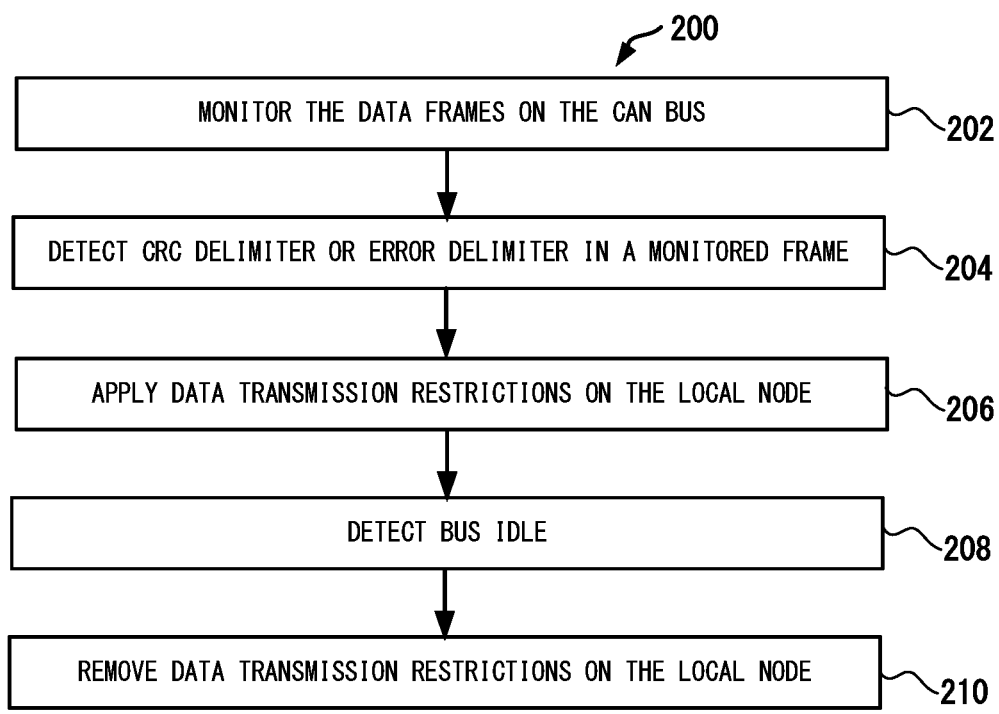
FIG. 5 illustrates a flow diagram to secure CAN data transmission in accordance with one or more embodiments of the present disclosure.

FIG. 5 shows a method 200 for preventing a malicious microcontroller (or ECU or local host) from disrupting or corrupting the data transmission on the CAN bus 100 by manipulating the bus idle detection. Accordingly, at step 202, the transceiver 120 monitors data on the CAN bus 100. The transceiver 120 is configured to be CAN protocol aware such that the transceiver 120 may decode the start of frame bit and may detect different types of data bit according to frame structure defined by the CAN protocol. At step 204, the transceiver 120 detects the CRC delimiter. In some examples, the transceiver 120 may also be configured to perform the operation of the method 200 based on the detection of the error delimiter instead of or in addition to the detection of the CRC delimiter. At step 206, the transceiver 120 applies data transmission restrictions on the microcontroller coupled with the microcontroller port 122 (e.g., the local host or local node). The data transmission restrictions may include only allowing the local node after sending the CRC delimiter to send a dominant signal of either 1) exactly one arbitration bit time followed by a recessive signal of at least one arbitration bit time or 2) a dominant signal of six or more arbitration bit-times. That is, the local node may be allowed only to send either exactly one or at least six dominant bits. At step 208, the transceiver 120 detect the bus idle and at step 210, the transceiver 120 removes the data transmission restrictions set forth at step 206. In some example, if the local node attempts to transmit a disallowed data prior between the steps 206 and 208, the transceiver 120 may block any data transmission from the local node at least for a configurable predetermined period of time. Such violations may also be reported to a network management. In some embodiments, if the local node violates the data transmission restrictions between the steps 206 and 208, an error signal may be issued on the CAN bus 100 by the transceiver 120 to cause the nodes on the CAN bus 100 to re-start their idle detection process simultaneously.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A transceiver for sending and receiving data from a controller area network (CAN) bus, the transceiver includes a microcontroller port, a transmitter and a receiver, wherein the transceiver is configured to detect a CRC delimiter or an error signal in a CAN frame and after the detection, allow a microcontroller coupled with the microcontroller port to only send a predetermined data pattern until a bus idle is detected.

2. The transceiver of claim 1, further configured to invalidate a data frame sent by the microcontroller by sending an error signal on the CAN bus if the data frame does not conform with the predetermined data pattern.

3. The transceiver of claim 2, further configured to disable the transmitter for a predetermined period after invalidating the data frame.

4. The transceiver of claim 1, wherein the predetermined data pattern includes a dominant bit followed by a recessive bit.

5. The transceiver of claim 1, wherein the predetermined data pattern includes at least six dominant bits.

6. The transceiver of claim 1, further configured to suppress a data frame sent by the microcontroller if a width of a bit in the data frame is smaller or broader than a predefined threshold.

7. The transceiver of claim 6, wherein the predefined threshold is determined based on a data transmission rate.

8. The transceiver of claim 1, wherein if the predetermined data pattern is repeated more than a predefined times after the detection of the CRC delimiter or the error signal, the transmitter is disabled for a preconfigured period of time.

9. The transceiver of claim 1, further configured to allow any CAN conform data pattern after the detection of the bus idle and until a next CRC delimiter or a next error delimiter is detected.

10. A method for preventing a node from interrupting a communication on a controller area network (CAN) bus, the method comprising:
monitoring a CAN data frame on the CAN bus; and
detecting a CRC delimiter or an error signal in the CAN data frame and upon the detection allowing the node to only send a predetermined data pattern until a bus idle is detected.

11. The method of claim 10, further including invalidating a data frame sent by the node by sending an error signal on the CAN bus if the data frame does not conform with the predetermined data pattern.

12. The method of claim 11, further including disabling the node for a predetermined period after invalidating the data frame.

13. The method of claim 10, wherein the predetermined data pattern includes a dominant bit followed by a recessive bit.

14. The method of claim 10, wherein the predetermined data pattern includes at least six dominant bits.

15. The method of claim 10, further including suppressing a data frame sent by the microcontroller if a width of a bit in the data frame is smaller or wider than a predefined threshold.

16. The method of claim 10, further including allowing any CAN conform data pattern after the detection of the bus idle and until a next CRC delimiter or a next error delimiter is detected.

17. The method of claim 15, wherein the predefined threshold is determined based on a data transmission rate.

\* \* \* \* \*